(12) United States Patent
Stenborg et al.

(10) Patent No.: US 9,644,975 B2
(45) Date of Patent: May 9, 2017

(54) METHOD AND SYSTEM FOR DETERMINING A POSITION OF A VEHICLE

(71) Applicant: VOLVO CAR CORPORATION, Gothenburg (SE)

(72) Inventors: Erik Stenborg, Gothenburg (SE); Joakim Sorstedt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/638,949

(22) Filed: Mar. 4, 2015

(65) Prior Publication Data
US 2015/0260530 A1 Sep. 17, 2015

(30) Foreign Application Priority Data
Mar. 11, 2014 (EP) .................................... 14158919

(51) Int. Cl.
*G01C 21/00* (2006.01)
*G01C 21/30* (2006.01)
(Continued)

(52) U.S. Cl.
CPC ......... *G01C 21/30* (2013.01); *G01C 21/3602* (2013.01); *G01S 19/13* (2013.01); *G06K 9/00798* (2013.01)

(58) Field of Classification Search
CPC combination set(s) only.
See application file for complete search history.

(56) References Cited

U.S. PATENT DOCUMENTS

| 5,612,882 A | * | 3/1997 | LeFebvre | ........... G01C 21/3453 340/990 |
| 6,223,117 B1 | * | 4/2001 | Labuhn | .............. B60K 31/0008 180/169 |

(Continued)

FOREIGN PATENT DOCUMENTS

| EP | 1959236 | 8/2008 |
| WO | 2013149149 | 10/2013 |

OTHER PUBLICATIONS

Extended European Search Report for EP 14158919.2, Completed by the European Patent Office, Dated Oct. 1, 2014, 6 Pages.
(Continued)

*Primary Examiner* — Jonathan L Sample
(74) *Attorney, Agent, or Firm* — Brooks Kushman P.C.

(57) ABSTRACT

A method performed by a positioning system of a vehicle is disclosed for determining a position of the vehicle along a road including one or several road markings arranged on a surface of the road. The positioning system detects road markings, matches detected road markings with mapped road markings of stored map data based on comparing characteristics of the detected road markings with mapped characteristics of the mapped road markings. The positioning system furthermore identifies a mapped identified road marking determined to correspond with a detected identified road marking, and determines a positioning estimate of the vehicle along the road based on a mapped road marking position associated with the mapped identified road marking. A positioning system, a vehicle including such a positioning system, and a mapping unit and a mapping method performed therein for creating map data to be utilized by the above mentioned positioning system are also disclosed.

15 Claims, 5 Drawing Sheets

(51) Int. Cl.
 *G01C 21/36* (2006.01)
 *G06K 9/00* (2006.01)
 *G01S 19/13* (2010.01)

(56) References Cited

U.S. PATENT DOCUMENTS

| | | | | |
|---|---|---|---|---|
| 6,459,387 | B1* | 10/2002 | Kobayashi | B60Q 1/085 340/988 |
| 6,711,493 | B1* | 3/2004 | Andrews | G08G 1/0104 340/903 |
| 6,873,911 | B2* | 3/2005 | Nishira | B60T 7/16 340/436 |
| 7,444,311 | B2* | 10/2008 | Engstrom | B60W 30/18181 706/20 |
| 7,765,058 | B2* | 7/2010 | Doering | B60R 16/0236 340/425.5 |
| 8,112,222 | B2* | 2/2012 | Nakao | G01C 21/3602 340/435 |
| 2004/0243301 | A1* | 12/2004 | Kim | G01C 21/3492 701/533 |
| 2005/0159851 | A1* | 7/2005 | Engstrom | B60W 30/18181 701/1 |
| 2006/0095193 | A1* | 5/2006 | Nishira | B60T 7/22 701/96 |
| 2007/0112500 | A1* | 5/2007 | Ogawa | B60K 6/48 701/96 |
| 2008/0120175 | A1* | 5/2008 | Doering | B60R 16/0236 705/14.67 |
| 2008/0208460 | A1* | 8/2008 | Nakao | G01C 21/3658 701/532 |
| 2008/0275618 | A1* | 11/2008 | Grimm | G08G 1/162 701/96 |
| 2009/0028388 | A1* | 1/2009 | Amagasaki | G06K 9/00805 382/104 |
| 2009/0088978 | A1* | 4/2009 | Ishikawa | G01C 21/26 701/514 |
| 2009/0138193 | A1* | 5/2009 | Katou | G01C 21/3658 701/533 |
| 2009/0174577 | A1* | 7/2009 | Nakamura | G06K 9/00798 340/995.1 |
| 2010/0088024 | A1* | 4/2010 | Takahara | B60W 40/072 701/532 |
| 2010/0161192 | A1* | 6/2010 | Nara | B60W 10/06 701/70 |
| 2010/0201816 | A1* | 8/2010 | Lee | B60R 1/12 348/148 |
| 2010/0292895 | A1* | 11/2010 | Nakamura | G08G 1/09623 701/41 |
| 2010/0295668 | A1* | 11/2010 | Kataoka | B62D 15/025 340/435 |
| 2011/0144907 | A1* | 6/2011 | Ishikawa | G01C 21/30 701/532 |
| 2011/0313665 | A1* | 12/2011 | Lueke | G01S 13/931 701/301 |
| 2012/0033074 | A1* | 2/2012 | Spangenberg | G06K 9/00798 348/148 |
| 2012/0269382 | A1* | 10/2012 | Kiyohara | G01C 21/26 382/103 |
| 2012/0310504 | A1* | 12/2012 | DuHadway | G01C 21/28 701/93 |
| 2013/0345944 | A1* | 12/2013 | Kasiraj | B60W 30/16 701/96 |
| 2014/0088862 | A1* | 3/2014 | Simon | G01C 21/3658 701/431 |
| 2014/0236414 | A1* | 8/2014 | Droz | B60W 30/00 701/28 |
| 2014/0343842 | A1* | 11/2014 | Ranganathan | G01C 21/30 701/472 |
| 2015/0260530 | A1* | 9/2015 | Stenborg | G01C 21/30 701/461 |

OTHER PUBLICATIONS

Ranganathan et al. IEEE/RSJ International Conference on Intelligent Robots and Systems (IROS) Nov. 3-7, 2013, p. 921-927, "Light-weight Localization for Vehicles using Road Markings".

* cited by examiner

METHOD AND SYSTEM FOR DETERMINING A POSITION OF A VEHICLE

CROSS-REFERENCE TO RELATED APPLICATIONS

This application claims foreign priority benefits under 35 U.S.C. §119(a)-(d) to European Patent Application No. 14158919.2, filed Mar. 11, 2014, which is incorporated by reference in its entirety.

TECHNICAL FIELD

The present disclosure relates to a positioning system of a vehicle and a method performed therein for determining a position of the vehicle.

BACKGROUND

In recent years, development of autonomous vehicles has been, and increasingly is, growing rapidly. The concept of autonomous driving relates to that the vehicle, at least to some extent, is driven without human interaction. That is, the vehicle may have an automation level of e.g. 0%<automation level≤100%, wherein 0% may represent that the vehicle is driven by a driver only, and 100% that the vehicle is driven completely autonomously. When having an automation level anywhere between 0% and 100%, the vehicle may autonomously perform some actions, as e.g. keeping a suitable distance to the vehicle ahead, while the driver may perform other actions, as e.g. overtaking another vehicle when appropriate. The closer to 100%, the more actions are performed autonomously by the vehicle.

Autonomous vehicles, also commonly known as autonomously driven vehicles, driverless vehicles, self-driving vehicles, or robot vehicles, are known to sense their surrounding with such techniques as e.g. radar, lidar, GPS and/or computer vision. Advanced control systems may interpret sensory information to identify appropriate paths, as well as obstacles. For instance, an autonomous vehicle may update its map based on sensory input, allowing the vehicle to keep track of its position even when conditions change or when it enters uncharted environments. Notwithstanding the foregoing, it is challenging to provide accurate vehicle positioning.

WO 2013/149149, for instance, relates to identifying a driven lane on a map and to improve a vehicle position estimate. There is suggested estimating a location of the vehicle using global navigation satellite system, and determining a closest mapped road to the estimated location of the vehicle. Furthermore, there is suggested that light detection and ranging (lidar) and camera systems are used in detection of, or ranging to, distinct features in the environment and that for vehicle positioning, the sensors may be used to detect street signs, buildings, or lane markings in the immediate vicinity of the vehicle.

However, although WO 2013/149149 discloses a solution enabling for refining the estimated location of the vehicle, the challenge of providing a vehicle position estimate with high accuracy, remains.

SUMMARY

Therefore an object of at least one embodiment herein may be to provide an improved approach of determining the position of a vehicle.

According to a first aspect of at least one embodiment herein, the object may be achieved by a method performed by a positioning system of a vehicle for determining a position of the vehicle along a road, which road comprises one or several road markings arranged on a road surface of the road. The positioning system detects a plurality of road markings. The positioning system furthermore matches road markings of said plurality with mapped road markings of stored map data, based on comparing detected characteristics of the road markings with mapped characteristics of the mapped road markings. Additionally, the positioning system identifies a mapped identified road marking determined to correspond with a detected identified road marking of said plurality. Furthermore, the positioning system determines a positioning estimate of the vehicle along the road based on a mapped road marking position associated with the mapped identified road marking.

Thereby, by the stored map data comprising mapped road markings and characteristics associated therewith, pre-obtained detailed information related to road markings is provided in said stored map data. Accordingly, detailed information of road markings detected at a current instant in time may be compared to detailed information of road markings pre-stored in the stored map data, in order to identify a mapped road marking supposedly corresponding to a currently detected road marking. Subsequently, upon identifying such a mapped road marking, pre-stored information related to a positioning of the de facto corresponding road marking may be taken into consideration in determining a position of the vehicle. Accordingly, considering that road markings may be positioned relatively close and/or frequent to one another and that position data is provided in the stored map data on an individual road marking level, positioning data is provided on a detailed "high resolution" level, thus enabling for detailed vehicle positioning estimates.

For that reason, an improved approach of determining the position of a vehicle is provided.

The technical features and corresponding advantages of the above mentioned method will be discussed in further detail in the following.

By introducing a method performed by a positioning system of a vehicle for determining a position of the vehicle along a road, which road comprises one or several road markings arranged on a road surface of the road, an approach is provided which enables for estimating positioning of a vehicle. The referred to vehicle may be any arbitrary vehicle, such as an autonomous vehicle, for instance an engine-propelled autonomous vehicle such as e.g. an autonomous car, truck, lorry, van, bus, tractor, military vehicle, air plane, and/or golf cart. The vehicle may further be provided with a GPS system. Furthermore, the road may be any road intended for vehicle driving, and may be of any shape, width and length, and comprise any arbitrary number of lanes, intersections, cross sections etc. "Road markings arranged on a road surface of the road" is throughout this disclosure intended to at least refer to road markings provided along the road, on the ground of the road. Furthermore, the road markings, also commonly referred to as "road markers", "lane markers", "lane markings", "center lines" etc., may for instance be 2-dimensional or essentially 2-dimensional, e.g. being represented by paint, such as white and/or yellow paint, provided on the road surface. Length, width, shape etc. of a road marking may vary, as well as distances and relations between road markings may vary.

Since the positioning system detects a plurality of road markings, an arbitrary number of road markings within range of detection are acknowledged. Said plurality may range from a single road marking up to tens or even hundreds or more thereof. The plurality of road markings which is detected may be arbitrarily positioned in relation to the vehicle, for instance straight in front of or at an angle in front of the vehicle, further ahead of the vehicle, or even underneath, to the left, to the right or behind the vehicle, or a combination thereof. For instance, the plurality may refer to road markings relatively far ahead of the vehicle should the vehicle be travelling with relatively high speed along the road, whereas the plurality may refer to road markings relatively close ahead, or even road markings positioned underneath the vehicle, should the vehicle be travelling with relatively low speed. Furthermore, the road markings may for instance be detected by means of sensing, for instance via camera, radar, lidar, laser and/or computer vision techniques etc.

Since the positioning system furthermore matches road markings of said plurality with mapped road markings of stored map data, based on comparing detected characteristics of the road markings with mapped characteristics of the mapped road markings, characteristics of road markings detected at a current time instant are compared with characteristics of pre-stored road markings. Thereby, different characteristics identifying respective road markings observed at a current instant in time may be checked against different characteristics of mapped road markings. Accordingly, considering that road markings are positioned relatively close to one another, and that road markings are compared with mapped road markings on an individual level, a "high resolution" approach is provided. That is, since road markings may be positioned more frequent and/or close to each other than other features such as e.g. curves or road signs, they may provide e.g. longitudinal information that may be recorded in a map and then matched against when driving. The road markings have the benefit of higher availability than using other features such as the previously mentioned e.g. curves or road signs.

"Mapped road markings of stored map data" is throughout this disclosure intended to be interpreted to at least refer to pre-obtained, pre-stored road markings as part of map data stored in the positioning system, in e.g. a map database. That is, once arbitrary input associated with the road, such as e.g. the road markings and their characteristics, have been obtained and stored, they are throughout this disclosure referred to as "mapped". The input to the map data, i.e. characteristics related to the road and its surrounding, and hence road markings and characteristics related thereto, is supposedly gathered in advance, and provided to the positioning system e.g. wirelessly or downloaded thereto by any other means. Furthermore, "mapped characteristics" may refer to one or several attributes related to the mapped road markings, whereas "detected characteristics" may refer to one or several attributes related to road markings detected at a current instant in time.

Since the positioning system identifies a mapped identified road marking determined to correspond with a detected identified road marking of said plurality, a pre-stored road marking considered to match a detected road marking is selected. That is, by comparing mapped characteristics of the mapped road marking with characteristics of the detected road markings, one of the mapped road markings, referred to as the "mapped identified road marking", is judged or assumed to correspond to one of the presently detected road markings, referred to as the "detected identified road marking". Thereby, the "detected identified road marking" is supposedly one and the same road marking de facto associated with the "mapped identified road marking". The "detected identified road marking" may be any one of the plurality of road markings. Furthermore, several road markings of the plurality may be judged to each have a corresponding match among the mapped road markings. Such a scenario may imply an improved accuracy in determining "correct" mapped identified road markings. Additionally, said identifying action may for instance, to some extent, coincide with the matching action discussed in the foregoing.

Since the positioning system determines a positioning estimate of the vehicle along the road based on a mapped road marking position associated with the mapped identified road marking, pre-stored road marking positioning data associated with the pre-stored identified road marking is utilized to estimate positioning of the vehicle. That is, by having identified a mapped road marking considered to correspond to the detected identified road marking, stored position information of a road marking de facto corresponding to the mapped identified road marking, and supposedly being one and the same as the detected identified road marking, is taken into account in determining the vehicle position. Thereby, considering that road markings may be positioned relatively frequent and/or close to one another and that position data is provided in the stored map data on an individual road marking level, positioning data is provided on a detailed "high resolution" level, thus enabling for detailed vehicle positioning estimates.

"A mapped road marking position" is throughout this disclosure intended to be interpreted to at least refer to pre-stored information regarding the position of the road marking de facto corresponding to the mapped identified road marking. The mapped road marking position may be arbitrarily expressed as suitable for the implementation at hand, for instance by means of coordinates or relative position of the de facto corresponding road marking in comparison to any surrounding entity. Furthermore, the mapped road marking position may comprise a plurality of values, which may relate to different parts of the de facto corresponding road marking. Additionally, the "positioning estimate of the vehicle" may be in relation to any arbitrary part of the de facto corresponding road marking, e.g. a midsection thereof, or a proximal or distal end thereof in view of the vehicle. The "positioning estimate of the vehicle" may be arbitrarily expressed as suitable for the implementation at hand, for instance as a longitudinal positioning along the road, for instance by means of relative position in comparison to the mapped road marking position, or expressed by means of coordinates. The "positioning estimate of the vehicle" may further be in relation to any arbitrary part of the vehicle, e.g. a midsection thereof, or a front end thereof. Furthermore, "based on" is throughout this disclosure intended to be interpreted to likewise include at least "utilizing", "considering" and "taking into account".

Additionally, in detecting road markings on an individual road marking level, road markings may be counted. Thereby, a vehicle positioning estimate may alternatively and/or additionally be based on a counted number of, e.g. passed, road markings.

According to an embodiment, a vision sensor unit comprised in the positioning system performs the previously mentioned detecting of the plurality of road markings. The referred to "vision sensor unit" may be any arbitrary sensor unit which to some extent may be comprised in one or a combination of suitable electronic devices, such as e.g. one or several integrated arbitrary electronic control unit (ECU) nodes. The vision sensor unit may furthermore comprise one or several vision sensors arranged in proximity to one another or distributed throughout the vehicle as appropriate for the implementation at hand, for instance arranged in a protected position supporting a substantially clear view, such that a clear view of the road, and subsequently road markings, may be provided. The vision sensor(s) may be arranged behind the windscreen in the vicinity of, or embedded with, the rear view mirror. The vision sensor unit may for instance support techniques such as vision sensing, e.g. camera, radar, lidar, laser and/or computer vision etc.

Alternatively and/or additionally, a matching unit comprised in the positioning system performs the previously mentioned matching of road markings. The referred to "matching unit" may be any arbitrary unit which to some extent may be comprised in one or a combination of suitable electronic devices, such as e.g. one or several integrated arbitrary electronic control unit (ECU) nodes.

Alternatively and/or additionally, the previously mentioned stored map data may be stored on a storage unit comprised in the positioning system. The referred to "storage unit" may be any arbitrary unit, and may for instance refer to a database holding said map data.

Alternatively and/or additionally, an identifying unit comprised in the positioning system performs the previously mentioned identifying of the mapped identified road marking. The referred to "identifying unit" may be any arbitrary unit which to some extent may be comprised in one or a combination of suitable electronic devices, such as e.g. one or several integrated arbitrary electronic control unit (ECU) nodes. Furthermore, the identifying unit may, for instance, be comprised the matching unit.

Alternatively and/or additionally, a positioning determining unit comprised in the positioning system performs the previously mentioned determining of the positioning estimate of the vehicle. The referred to "positioning determining unit" may be any arbitrary unit which to some extent may be comprised in one or a combination of suitable electronic devices, such as e.g. one or several integrated arbitrary electronic control unit (ECU) nodes.

According to another embodiment, the previously mentioned determining of a positioning estimate of the vehicle, may comprise estimating a relative distance from the detected identified road marking to the vehicle. That is, a distance between the detected identified road marking and the vehicle is determined, for instance based on the previously mentioned detection of the plurality of road markings, additionally and/or alternatively at one or several subsequent occasions of acknowledging the detected identified road marking. Thereby, in assuming that the detected identified road marking is the road marking de facto corresponding to the mapped identified road marking, a position of the vehicle may be determined in relation to the detected identified road marking. The estimating of the relative distance may for instance be performed with support from the previously mentioned vision sensor unit, which may acknowledge, i.e. detect, the distance to the detected identified road marking. Any arbitrary part of the detected identified road marking may be utilized for estimating the relative distance, e.g. a midsection thereof, or a proximal or distal end thereof in view of the vehicle.

According to yet another embodiment, the previously mentioned stored map data may be expressed based on global coordinates. Thereby, global coordinates may be utilized to express e.g. mapped road marking characteristics, mapped road marking positions, and/or positioning estimates of the vehicle etc.

According to still another embodiment, the previously mentioned detecting of a plurality of road markings may comprise detecting a plurality of lane markings and/or center lines, which lane markings and/or center lines are intermittently arranged to form straight and/or curved intermittent lines along the road. Thereby, available lane markings and/or center lines, which commonly are positioned frequently and/or at a relatively short distance from one another on the road surface along the road, may be utilized in determining the vehicle positioning estimate. "Intermittently arranged" is throughout this disclosure intended to indicate that the road markers may be arranged semi-continuously, i.e. in relative proximity to one another.

According to one embodiment, the characteristics of the road markings and/or the mapped characteristics of the mapped road markings may comprise one or a combination of lengths, widths, curvatures or shapes of road markings, and/or distances, intervals, or relations between road markings. Thereby, varying attributes characterizing road markings on respective individual levels, as well as in relation to one another, may be taken into consideration. Accordingly, the detailed characteristics may assist in the matching of road markings and subsequently in the identifying of the mapped identified road marking.

According to an example, road markings of center lines are commonly of a predetermined first length, distributed at a predetermined first interval, whereas lane markings may be of a predetermined second length, distributed at a predetermined second interval. Furthermore, e.g. a proximal end of a center line marking may at recurring intervals be aligned with a proximal end of a lane marking. All these attributes may be part of the characteristics of a specific road marking. Accordingly, the different properties of the respective road markings as well as the relation between the different types of road markings may assist in the matching of road markings, and subsequently in the identifying of the mapped identified road marking.

According to another embodiment, the previously mentioned detecting of a plurality of road markings may comprise detecting a proximal end and/or a distal end of a road marking of the plurality of road markings. Additionally, the previously mentioned determining the positioning estimate of the vehicle may comprise determining the positioning estimate of the vehicle based on a mapped proximal end position and/or a mapped distal end position associated with the mapped identified road marking. Thereby, in detecting a proximal end and/or a distal end of a road marking, in view of the vehicle, a longitudinal positioning of the road marking may be established. Furthermore, in determining the positioning estimate of the vehicle based on a mapped proximal end position and/or a mapped distal end position, a proximal end and/or a distal end of a road marking de facto corresponding to the mapped road marking, and supposedly being one and the same as the currently detected identified road marking, is taken into consideration in determining the vehicle positioning estimate. The "mapped proximal end position" refers to a proximal end of the road marking de facto corresponding to the mapped road marking, whereas the "mapped distal end position" refers to a distal end of the road marking de facto corresponding to the mapped road marking.

According to yet another embodiment, the positioning system may further detect at least one fixed object along the road. The positioning system may additionally match the at least one fixed object with mapped fixed objects based on comparing detected characteristics of the at least one fixed object with mapped characteristics of the mapped fixed objects. Furthermore, the positioning system may identify a mapped identified fixed object determined to correspond with a detected identified fixed object of the at least one fixed object. The previously mentioned determining of the positioning estimate of the vehicle may then furthermore comprise determining the positioning estimate of the vehicle additionally based on a mapped fixed object position associated with the mapped identified fixed object. Thereby, in addition to considering road markings in estimating the vehicle position, additionally a fixed object may be taken into consideration for assisting in determining the positioning estimate of the vehicle. For instance, the fixed object may assist in a more robust and/or speeded up matching step.

The referred to "fixed object" may be any object considered to be essentially stationary along the road, e.g. a road sign, lamppost, etc., or even a building, sculpture or tree etc. Furthermore, the referred to "detected characteristics of the at least one fixed object" is throughout this disclosure intended to refer to characteristics of the at least one fixed object having been detected by the positioning system. The detected characteristics of the at least one fixed object may, optionally, comprise one or a combination of lengths, widths, curvatures or shapes of the at least one fixed object, and/or distances, intervals or relations between the fixed objects. To great extent, conditions and advantages discussed in the foregoing in relation to the road markings correspondingly apply to the fixed objects in a similar manner, why these are not further discussed. Furthermore, definitions such as the use of the word "mapped" described in the foregoing in relation to road markings, correspondingly apply to the fixed object in a similar manner, why neither these are further discussed.

According to a further embodiment, the previously mentioned vision sensor unit may perform the above mentioned detecting of at least one fixed object, the previously mentioned matching unit may perform the above mentioned matching of the at least one fixed object, and/or the previously mentioned identifying unit may perform the above mentioned identifying of the mapped identified fixed object. Thereby, resources may be utilized in an efficient manner.

According to one embodiment, the previously mentioned detecting of a plurality of road markings and/or the previously mentioned detecting of at least one fixed object, comprises detecting by means of at least one camera. Thereby, road markings, and optionally fixed objects, may be detected in a convenient manner. The camera(s) may be arbitrarily arranged throughout the vehicle, for instance arranged in a protected position supporting a substantially clear view, such that a clear view of the road markings, and optionally fixed objects, may be provided. According to embodiments herein, the camera(s) may be arranged behind the windscreen in the vicinity of, or embedded with, the rear view mirror.

According to a second aspect of at least one embodiment herein, the object may be achieved by a positioning system of a vehicle for determining a position of the vehicle along a road, which road comprises one or several road markings arranged on a road surface of the road. The positioning system comprises a vision sensor unit adapted for detecting a plurality of road markings. The positioning system further comprises a matching unit adapted for matching road markings of the plurality with mapped road markings of stored map data stored on a storage unit of the positioning system, based on comparing detected characteristics of the road markings with mapped characteristics of the mapped road markings. Additionally, the positioning system comprises an identifying unit adapted for identifying a mapped identified road marking determined to correspond with a detected identified road marking of the plurality of road markings. Furthermore, the positioning system comprises a positioning determining unit adapted for determining a positioning estimate of the vehicle along the road based on a mapped road marking position associated with the mapped identified road marking. Similar advantages as those mentioned in the foregoing in relation to the first aspect correspondingly apply to the second aspect, so these advantages are not further discussed.

According to a third aspect of at least one embodiment herein, the object may be achieved by a vehicle comprising the previously mentioned positioning system, e.g. an autonomous vehicle. Yet again, similar advantages as those mentioned in the foregoing in relation to the first aspect correspondingly apply to the third aspect, so these advantages are not further discussed.

According to a fourth aspect of at least one embodiment herein, the object may be achieved by a method performed by a mapping unit for creating map data reflecting characteristics associated with a road, for enabling a positioning system of a vehicle to determine a position of the vehicle along the road. The mapping unit creates the map data by obtaining characteristics associated with the road, which characteristics associated with the road comprises characteristics of one or several road markings arranged on a road surface of the road, to thereby enable for the positioning system to perform any of the methods described in the foregoing in relation to the first aspect. Once again, similar advantages as those mentioned in the foregoing in relation to the first aspect correspondingly apply to the fourth aspect, so these advantages are not further discussed. Mapping, i.e. tagging, of the characteristics associated with the road, may for instance be accomplished by any known positioning method such as e.g. GPS (Global Positioning System), and further e.g. RTK (Real Time Kinematic).

According to a fifth aspect of at least one embodiment herein, the object may be achieved by a mapping unit for creating map data reflecting characteristics associated with a road, for enabling a positioning system of a vehicle to determine a position of the vehicle along the road. The mapping unit is adapted to create the map data by obtaining characteristics associated with the road, which characteristics associated with the road comprises characteristics of one or several road markings arranged on a road surface of the road, to thereby enable for the positioning system to perform any of the methods described in the foregoing in relation to the first aspect. Once more, similar advantages as those mentioned in the foregoing in relation to the first aspect correspondingly apply to the fifth aspect, so these advantages are not further discussed.

BRIEF DESCRIPTION OF THE DRAWINGS

Various aspects of the non-limiting embodiments of the disclosure, including particular features and advantages, will be readily understood from the following detailed description and the accompanying drawings, in which.

DETAILED DESCRIPTION

Figure 1:
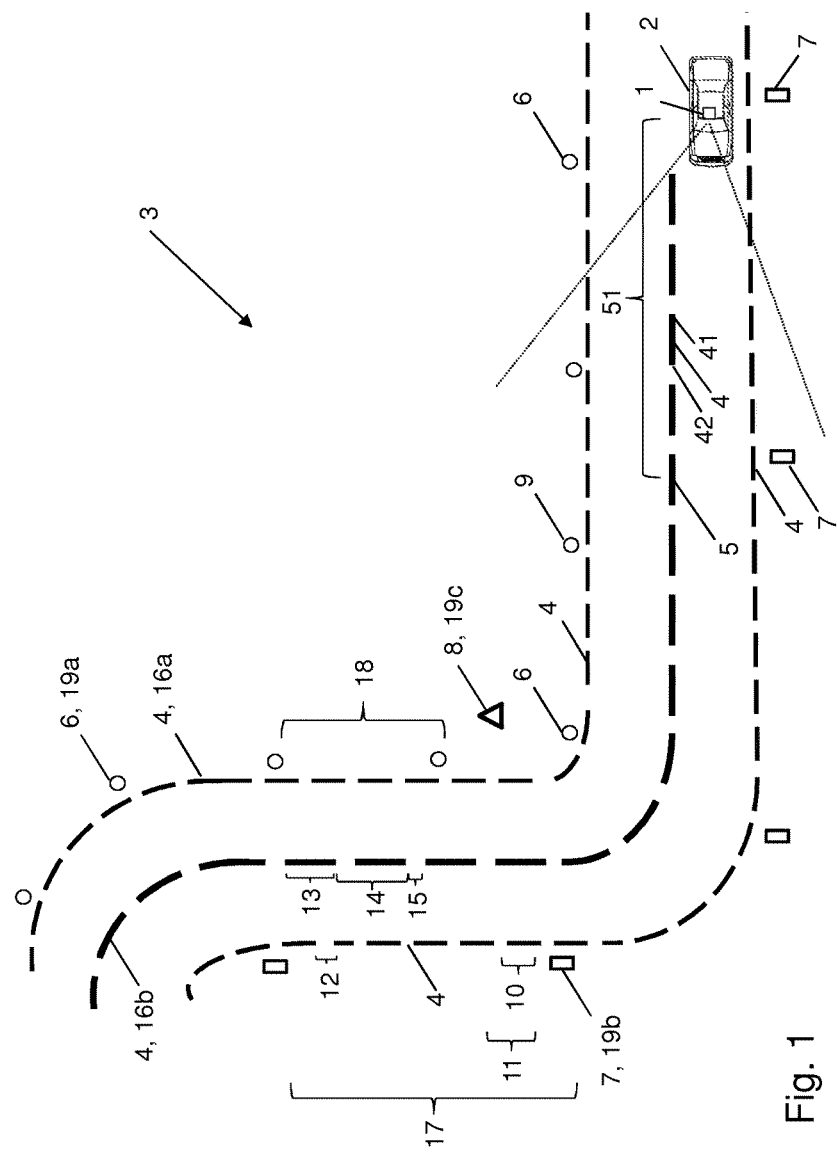
FIG. 1 illustrates an exemplifying autonomous vehicle comprising a positioning system for determining a position of the vehicle according to embodiments of the disclosure.

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to determining a position of a vehicle, there will be disclosed an approach for enabling detailed vehicle positioning estimates to be provided.

Referring now to the figures and FIG. 1 in particular, there is depicted an exemplifying positioning system 1 comprised in a vehicle 2 according to embodiments of the disclosure. The positioning system 1 is adapted for determining a position of the vehicle 2 along a road 3, which road 3 comprises one or several road markings 4 arranged on a road surface of the road 3. The vehicle 2 in the shown exemplifying embodiment is an autonomous car, i.e. a car which may be autonomously driven. Furthermore, the vehicle 2 is in the shown embodiment driven on the left hand side of the road, although this is merely exemplifying; according to alternative embodiments, the vehicle 2 may likewise be driven on the right hand side of the road. The shown road 3 comprises one lane in each direction, although according to alternative embodiments, the road 3 may be any road intended for vehicle driving, and may be of any shape, width and length, and comprise any arbitrary number of lanes, intersections, cross sections etc. The road markings 4 are in the exemplifying embodiment represented by a plurality of lane markings and center lines, which lane markings and center lines are intermittently arranged to form straight and/or curved intermittent lines along the road 3, on the road surface thereof. The road markings 4 are in the shown embodiment represented by paint, such as white and/or yellow paint, provided on the road surface. Furthermore, a road marking 4 may as shown, optionally, be referred to as having a proximal end 41 and/or a distal end 42, in perspective of the vehicle 2. Also illustrated in FIG. 1 is a detected identified road marking 5 and a relative distance 51 from the detected identified road marking 5 to the vehicle 2, which detected identified road marking 5 and relative distance 51 will be further described later on.

Additionally, there are exemplifying optional fixed objects 6, 7, 8 depicted along the road 3 in FIG. 1. A fixed object 6, 7, 8 may be any object considered to be essentially stationary along the road 3, e.g. a road sign, lamppost, etc., or even a building, sculpture or tree etc. The fixed objects 6, 7, 8 of FIG. 1 are represented by lampposts 6, 7 and a building 8. Also illustrated in FIG. 1 is a detected identified fixed object 9, which detected fixed object 9 will be further described later on.

The road markings 4 and the optional fixed objects 6, 7, 8 may each be described, and subsequently recognized, by means of their respective characteristics. In FIG. 1, characteristics of the road markings 4 are referred to as detected characteristics 10, 11, 12, 13, 14, 15, 16a, 16b of the road markings 4, after having been detected by the vehicle 2. In a similar manner, characteristics of the fixed objects 6, 7, 8 are referred to as detected characteristics 17, 18, 19a, 19b, 19c of the fixed objects 6, 7, 8, after having been detected by the vehicle 2. The characteristics 10, 11, 12, 13, 14, 15, 16a, 16b of the road markings 4 may as shown in the exemplifying embodiment, optionally, comprise one or a combination of lengths 10, 13, widths, curvatures or shapes 16a, 16b of road markings 4, and/or distances 12, 15, intervals 11, 14 or relations between road markings 4. In a similar manner, the detected characteristics 17, 18, 19a, 19b, 19c of the fixed objects 6, 7, 8 may as shown in the exemplifying embodiment, optionally, comprise one or a combination of lengths, widths, curvatures or shapes 19a, 19b, 19c of the fixed objects 6, 7, 8, and/or distances, intervals 17, 18 or relations between the fixed objects 6, 7, 8. The detected characteristics 10, 11, 12, 13, 14, 15, 16a, 16b of the road markings 4, as well as the detected characteristics 17, 18, 19a, 19b, 19c of the fixed objects 6, 7, 8, will be described in further detail later on.

Figure 2:
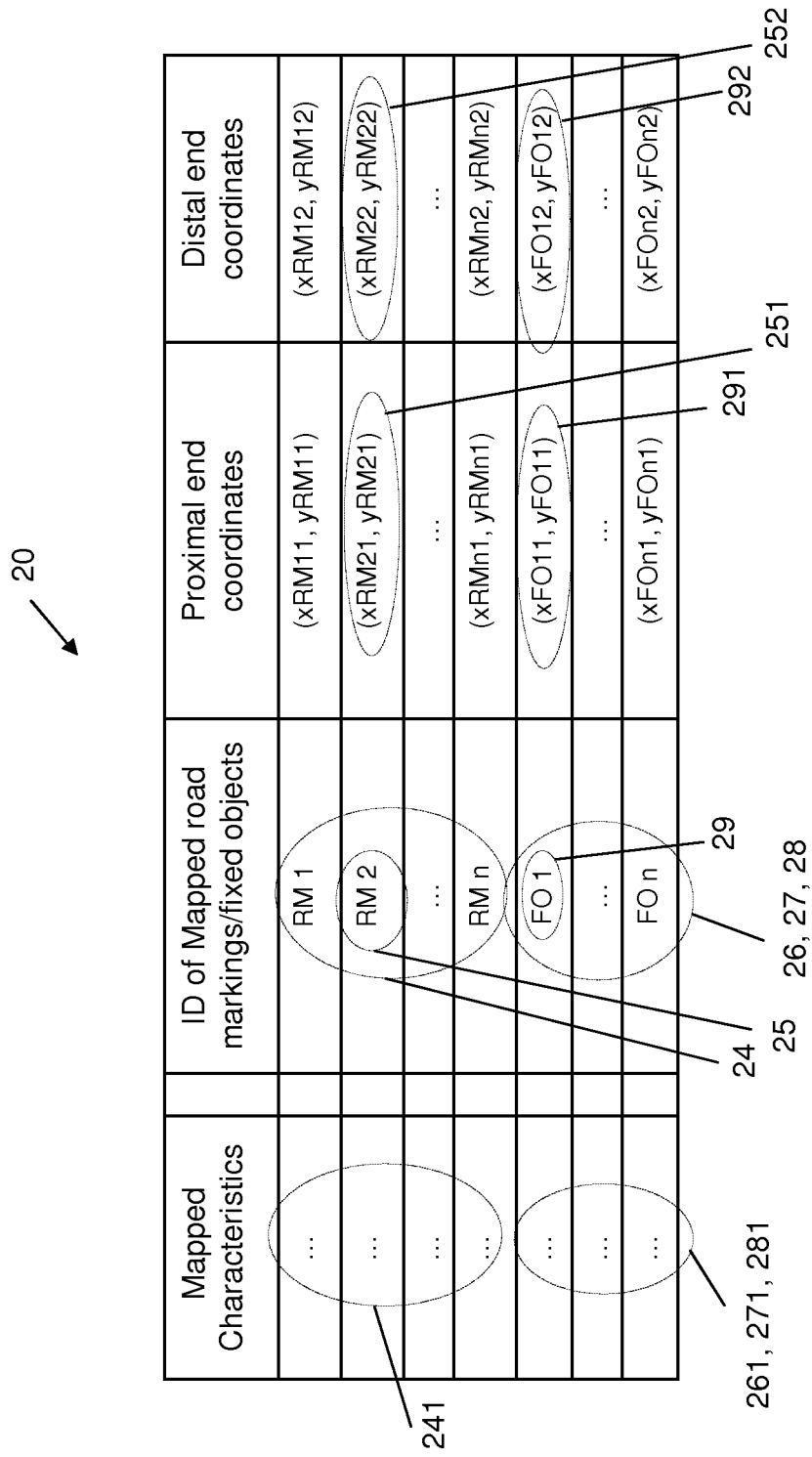
FIG. 2 illustrates exemplifying stored map data according to embodiments of the disclosure.

FIG. 2 illustrates exemplifying stored map data 20 according to embodiments of the disclosure. The stored map data 20, which for instance may be arranged in, and/or represented by, a database, refers to pre-obtained, pre-stored, i.e. "mapped", arbitrary input associated with the road 3 and its surrounding. As previously mentioned, once arbitrary input such as e.g. road markings and their characteristics have been obtained and stored, they are throughout this disclosure referred to as "mapped".

The stored map data 20 comprises mapped road markings 24 and mapped characteristics 241 thereof, which reflect identity and characteristics of road markings 4 along the road 3, which have been pre-obtained, and subsequently pre-stored. The mapped characteristics 241 of the mapped road markings 24 may as shown in the exemplifying embodiment, optionally, comprise one or a combination of lengths 10, 13, widths, curvatures or shapes 16a, 16b of road markings 4, and/or distances 12, 15, intervals 11, 14 or relations between road markings 4.

Also comprised in the map data 20 of FIG. 2 is a mapped identified road marking 25 and a mapped road marking position 251, 252 associated with the mapped identified road marking 25, here represented by an optional mapped proximal end position 251 and an optional mapped distal end position 252, all of which will be further described later on. The stored map data 20 may as shown in the exemplifying embodiment, optionally, be expressed based on global coordinates.

Additionally, the stored map data 20 may as shown in the exemplifying embodiment, optionally, comprise mapped fixed objects 26, 27, 28 and mapped characteristics 261, 271, 281 of the mapped fixed objects 26, 27, 28, which reflect identity and characteristics of fixed objects 6, 7, 8 along the road 3, which have been pre-obtained, and subsequently pre-stored. Also comprised in the stored map data 20 is an optional mapped identified fixed object 29 and a mapped fixed object position 291, 292 associated with the mapped identified fixed object 29, here represented by an optional mapped proximal end position 291 and an optional mapped distal end position 292, all of which will be further described later on. It may be noted that should a proximal end and a distal end of a fixed object 6, 7, 8 which the mapped identified fixed object 29 reflects, essentially coincide, then the mapped proximal end position 291 and the mapped distal end position 292 may coincide, e.g. be represented by the same or essentially the same coordinates. This may be the case for a fixed object 6, 7, 8 such as e.g. a lamppost.

Figure 3:
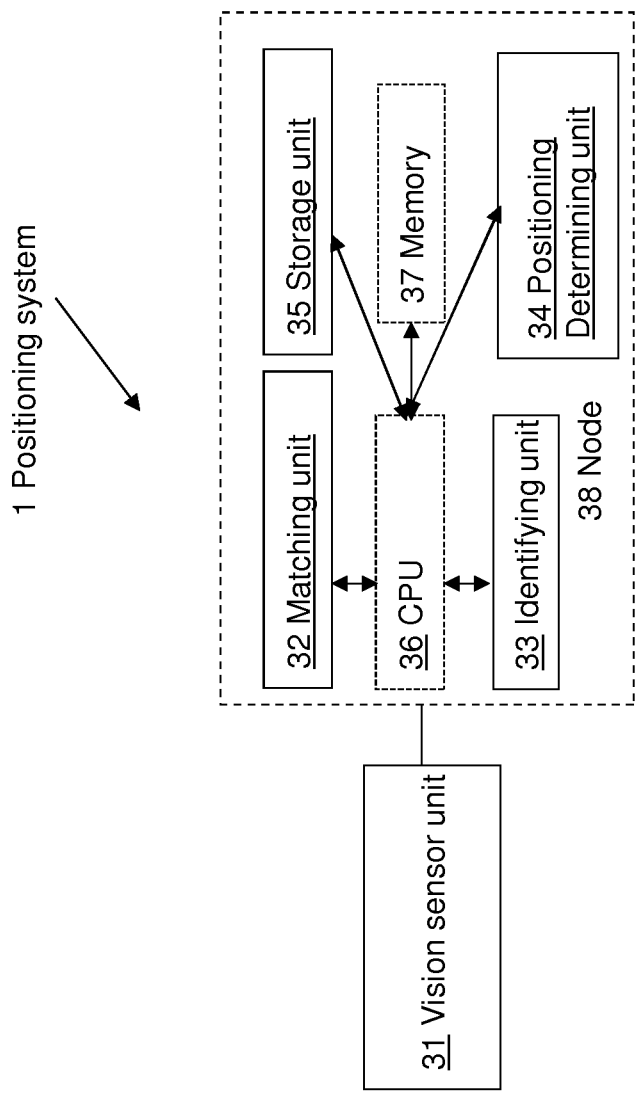
FIG. 3 is a schematic block diagram illustrating a positioning system according to embodiments of the disclosure.

As further shown in FIG. 3, which depicts a schematic block diagram illustrating a positioning system 1 according to embodiments of the disclosure, the positioning system 1 comprises a vision sensor unit 31, which optionally may comprise at least one camera. The positioning system 1 further comprises a matching unit 32, an identifying unit 33, a positioning determining unit 34 and a storage unit 35. Furthermore, the embodiments herein for enabling the positioning system 1 of the vehicle 2 to determine a position of the vehicle 2 may be implemented through one or more processors, such as a processor 36, here denoted CPU, together with computer program code for performing the functions and actions of the embodiments herein. Said program code may also be provided as a computer program product, for instance in the form of a data carrier carrying computer program code for performing the embodiments herein when being loaded into the positioning system 1. One such carrier may be in the form of a CD ROM disc. It is however feasible with other data carriers such as a memory stick. The computer program code may furthermore be provided as pure program code on a server and downloaded to the positioning system 1.

The positioning system 1 may further comprise a memory 37 comprising one or more memory units. The memory 37 may be arranged to be used to store e.g. information, and further to store data, configurations, schedulings, and applications, to perform the methods herein when being executed in the positioning system 1. The memory 37 may optionally comprise the storage unit 35, or the storage unit 35 may optionally comprise the memory 37. Furthermore, the vision sensor unit 31, the matching unit 32, the identifying unit 33, the positioning determining unit 34, the storage unit 35, the processor 36, and the memory 37 may for instance be implemented in one or several arbitrary nodes 38. A node 38 may be an electronic control unit (ECU) or any suitable generic electronic device. Those skilled in the art will also appreciate that the vision sensor unit 31, the matching unit 32, the identifying unit 33, the positioning determining unit 34, and the storage unit 35 described above, and which will be described in more detail later on in this description, may refer to a combination of analog and digital circuits, and/or one or more processors configured with software and/or firmware, e.g. stored in a memory such as the memory 37, that when executed by the one or more processors such as the processor 36 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 4:
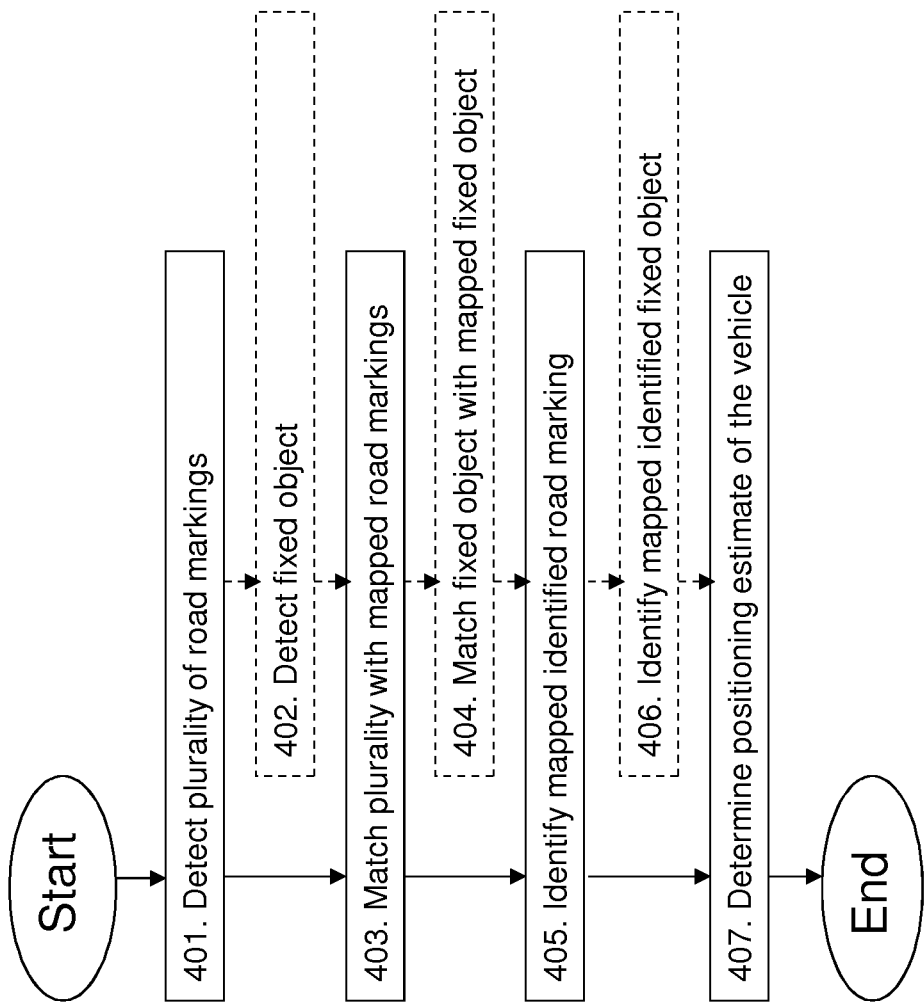
FIG. 4 is a flowchart depicting an exemplifying method for determining a position of a vehicle according to embodiments of the disclosure.

FIG. 4 is a flowchart depicting an exemplifying method for determining a position of a vehicle 2 according to embodiments of the disclosure. The method is performed by the positioning system 1 of the vehicle 2 for determining a position of the vehicle 2 along the road 3, which road 3 comprises one or several road markings 4 arranged on a road surface of the road 3. The exemplifying method, which may be continuously repeated, comprises the following actions discussed with support from FIGS. 1-3. The actions may be taken in any suitable order. It should furthermore be noted that the optional Actions 402, 404 and 406 may be performed irrespective of Actions 401, 403 and 405.

Action 401

In Action 401, the positioning system 1 detects, e.g. by means of the vision sensor unit 31, a plurality of road markings 4.

Optionally, the Action 401 of detecting a plurality of road markings 4, comprises detecting a plurality of lane markings 4 and/or center lines 4, which lane markings 4 and/or center lines 4 are intermittently arranged to form straight and/or curved intermittent lines along the road 3.

Furthermore, the Action 401 of detecting a plurality of road markings 4, may comprise detecting the proximal end 41 and/or the distal end 42 of a road marking of the plurality of road markings 4.

Additionally, the Action 401 of detecting a plurality of road markings 4, may optionally comprise detecting the plurality of road markings 4 by means of at least one camera.

Action 402

In optional Action 402, the positioning system 1 detects, e.g. by means of the vision sensor unit 31, at least one fixed object 6, 7, 8 along the road 3.

Optionally, the Action 402 of detecting at least one fixed object 6, 7, 8, may comprise detecting the at least one fixed object 6, 7, 8 by means of at least one camera.

Action 403

In Action 403, the positioning system 1 matches, e.g. by means of the matching unit 32, road markings 4 of the plurality of road markings 4 with mapped road markings 24 of stored map data 20, based on comparing detected characteristics 10, 11, 12, 13, 14, 15, 16a, 16b of the road markings 4 with mapped characteristics 241 of the mapped road markings 24.

Optionally, the characteristics 10, 11, 12, 13, 14, 15, 16a, 16b of the road markings 4 and/or the mapped characteristics 241 of the mapped road markings 24 comprise one or a combination of lengths 10, 13, widths, curvatures or shapes 16a, 16b of road markings 4, and/or distances 12, 15, intervals 11, 14 or relations between road markings 4.

Furthermore, the stored map data 20 may be expressed based on global coordinates.

Additionally, the stored map data may be stored on the storage unit 35 comprised in the positioning system 1.

Action 404

In optional Action 404, the positioning system 1 matches, e.g. by means of the matching unit 32, the at least one fixed object 6, 7, 8 with mapped fixed objects 26, 27, 28 based on comparing detected characteristics 17, 18, 19a, 19b, 19c of the at least one fixed object 6, 7, 8 with mapped characteristics 261, 271, 281 of the mapped fixed objects 26, 27, 28.

Action 405

In Action 405, the positioning system 1 identifies, e.g. by means of the identifying unit 33, a mapped identified road marking 25 determined to correspond with a detected identified road marking 5 of the plurality of road markings 4.

Action 406

In optional Action 406, the positioning system 1 identifies, e.g. by means of the identifying unit 33, a mapped identified fixed object 29 determined to correspond with a detected identified fixed object 9 of the at least one fixed object 6, 7, 8.

Action 407

In Action 407, the positioning system 1 determines, e.g. by means of the positioning determining unit 34, a positioning estimate of the vehicle 2 along the road 3 based on a mapped road marking position 251, 252 associated with the mapped identified road marking 25.

Optionally, provided that the Action 401 of detecting a plurality of road markings 4 comprises detecting the proximal end 41 and/or the distal end 42 of a road marking of the plurality of road markings 4, the Action 407 of determining a positioning estimate of the vehicle 2, may comprise determining the positioning estimate of the vehicle 2 based on a mapped proximal end position 251 and/or a mapped distal end position 252 associated with the mapped identified road marking 25.

Furthermore, provided that optional Actions 402, 404 and 406 have been performed, the Action 407 of determining a positioning estimate of the vehicle 2, may comprise determining the positioning estimate of the vehicle 2 additionally based on a mapped fixed object position 291, 292 associated with the mapped identified fixed object 29.

Additionally, the Action 407 of determining a positioning estimate of the vehicle 2, may comprise estimating a relative distance 51 from the detected identified road marking 5 to the vehicle 2.

Consequently, according to the vehicle positioning described in the foregoing, considering that road markings 4 may be positioned relatively close and/or frequent to one another and that position data (251, 252) is provided in the stored map data 20 on an individual road marking level, positioning data is provided on a detailed "high resolution" level, thus enabling for detailed vehicle positioning estimates.

Figure 5:
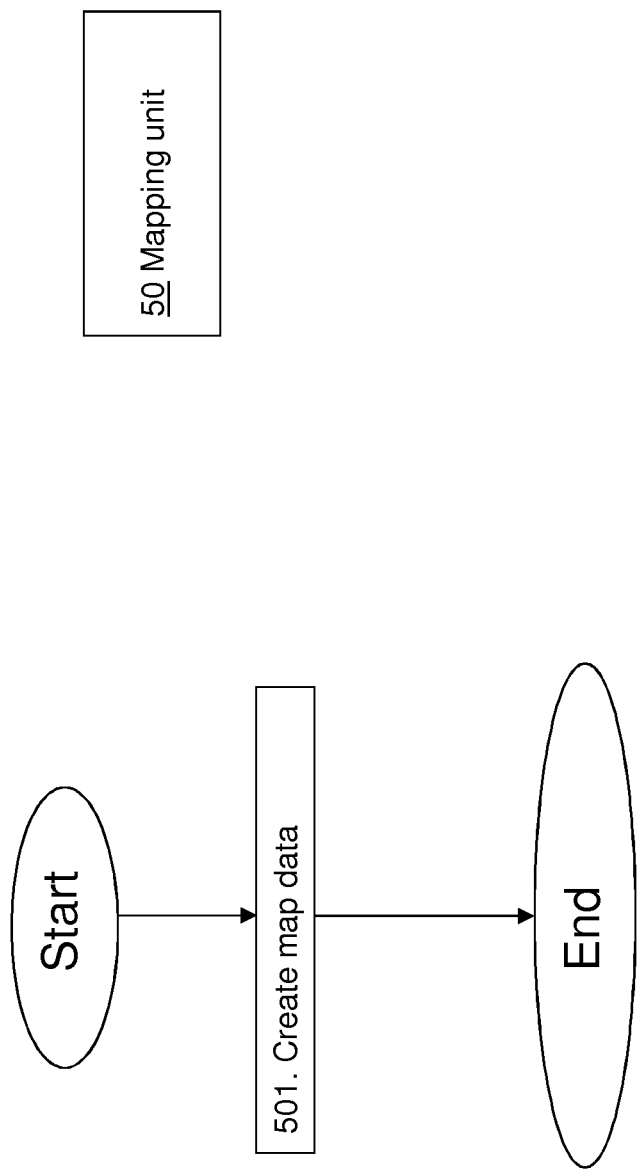
FIG. 5 illustrates a flowchart depicting an exemplifying method for creating map data, and a mapping unit for creating such map data, according to embodiments of the disclosure.

FIG. 5 illustrates a flowchart depicting an exemplifying method for creating map data 20, and a mapping unit 50 for creating such map data 20, according to embodiments of the disclosure. The method, which is performed by the mapping unit 50, creates map data 20 reflecting characteristics associated with the road 3, for enabling the positioning system 1 of the vehicle 2 to determine a position of the vehicle 2 along the road 3. Mapping, i.e. tagging, of the characteristics associated with the road, may for instance be accomplished by any known positioning method such as e.g. GPS (Global Positioning System), and further e.g. RTK (Real Time Kinematic).

The exemplifying method, which may be continuously repeated, comprises the following action discussed with support from FIGS. 1-4.

Action 501

In Action 501, the mapping unit 50 creates the map data 20 by obtaining characteristics associated with the road 3, which characteristics associated with the road 3 comprises characteristics of one or several road markings 4 arranged on a road surface of the road 3, to thereby enable for the positioning system 1 to perform as described with reference to FIG. 4.

Optionally, the characteristics associated with the road 3 may additionally comprise characteristics of at least one fixed object 6, 7, 8 along the road 3, to thereby enable for the positioning system 1 to perform as described with reference to FIG. 4.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method performed by a positioning system of a vehicle for determining a longitudinal position of the vehicle along a road, the road comprising one or more road markings arranged on a surface of the road, the method comprising:
   detecting, by a sensor, a plurality of road markings;
   matching, by a matching unit, road markings of the plurality of road markings with mapped road markings of stored map data based on comparing detected characteristics of the plurality of road markings with mapped characteristics of the mapped road markings, wherein the mapped characteristics comprise one or a combination of distances, intervals or relations between road markings;
   identifying, by an identifying unit, a mapped identified road marking determined to correspond with a detected identified road marking of the plurality of road markings; and
   determining, by a positioning determining unit, a longitudinal positioning estimate of the vehicle along the road based on a mapped road marking position associated with the mapped identified road marking.

2. The method according to claim 1, wherein:
   the detecting the plurality of road makings is performed by a vision sensor unit comprising the sensor, the vision sensor unit comprised in the positioning system;
   the matching road markings of the plurality of road markings is performed by the matching unit comprised in the positioning system;
   the stored map data is stored on a storage unit comprised in the positioning system;
   the identifying the mapped identified road marking is performed by the identifying unit comprised in the positioning system; or
   the determining the positioning estimate of the vehicle is performed by the positioning determining unit comprised in the positioning system.

3. The method according to claim 1 wherein determining a positioning estimate of the vehicle comprises estimating a relative distance from the detected identified road marking to the vehicle.

4. The method according to claim 1 wherein the stored map data is expressed based on global coordinates.

5. The method according to claim 1 wherein detecting a plurality of road markings comprises detecting a plurality of lane markings or center lines, which lane markings or center lines are intermittently arranged to form straight or curved intermittent lines along the road.

6. The method according to claim 1 wherein the characteristics of the road markings and/or the mapped characteristics of the mapped road markings comprise one or a combination of lengths, widths, curvatures or shapes of road markings, and distances, intervals or relations between road markings.

7. The method according to claim 1 wherein detecting a plurality of road markings comprises:
   detecting a proximal end and/or a distal end of a road marking of the plurality of road markings; and
   wherein the determining the positioning estimate of the vehicle comprises:
   determining the positioning estimate of the vehicle based on a mapped proximal end position or a mapped distal end position associated with the mapped identified road marking.

8. The method according to claim 1 further comprising:
   detecting at least one fixed object along the road;
   matching the at least one fixed object with mapped fixed objects based on comparing detected characteristics of the at least one fixed object with mapped characteristics of the mapped fixed objects; and
   identifying a mapped identified fixed object determined to correspond with a detected identified fixed object of the at least one fixed object;
   wherein the determining furthermore comprises:
   determining the positioning estimate of the vehicle additionally based on a mapped fixed object position associated with the mapped identified fixed object.

9. The method according to claim 8 wherein:
   the detecting at least one fixed object is performed by the sensor;
   the matching the at least one fixed object is performed by the matching unit; or
   the identifying the mapped identified fixed object is performed by the identifying unit.

10. The method according to claim 8, wherein the detecting a plurality of road markings or the detecting at least one fixed object comprises detecting by at least one camera.

11. A positioning system for determining a longitudinal position of a vehicle along a road, which road comprises one or several road markings arranged on a surface of the road, the positioning system comprising:
    a vision sensor unit adapted for detecting a plurality of road markings;
    a matching unit adapted for matching road markings of the plurality of road markings with mapped road markings of stored map data stored on a storage unit of the positioning system, based on comparing detected characteristics of the plurality of road markings with mapped characteristics of the mapped road markings, wherein the mapped characteristics comprise one or a combination of distances, intervals or relations between road markings;
    an identifying unit adapted for identifying a mapped identified road marking determined to correspond with a detected identified road marking of the plurality; and
    a positioning determining unit adapted for determining a longitudinal positioning estimate of the vehicle along the road based on a mapped road marking position associated with the mapped identified road marking.

12. The positioning system according to claim 11 further comprising a vehicle adapted to host the positioning system.

13. A method performed by a mapping unit for creating map data reflecting characteristics associated with a road, for enabling a positioning system of a vehicle to determine a position of the vehicle along the road, the method comprising:
    creating the map data by obtaining characteristics associated with the road, the characteristics associated with the road comprising characteristics of one or several road markings arranged on a road surface of the road, wherein the characteristics comprise one or a combination of distances, intervals or relations between road markings, to thereby enable a method performed by a positioning system of a vehicle for determining a longitudinal position of the vehicle along a road, the road comprising one or more road markings arranged on a surface of the road, the method including
    detecting, by a sensor, a plurality of road markings;
    matching, by a matching unit, road markings of the plurality of road markings with mapped road markings of stored map data based on comparing detected characteristics of the plurality of road markings with mapped characteristics of the mapped road markings, wherein the mapped characteristics comprise one or a combination of distances, intervals or relations between road markings;
    identifying, by an identifying unit, a mapped identified road marking determined to correspond with a detected identified road marking of the plurality of road markings; and
    determining, by a positioning determining unit, a longitudinal positioning estimate of the vehicle along the road based on a mapped road marking position associated with the mapped identified road marking.

14. A mapping unit for creating map data reflecting characteristics associated with a road, for enabling a positioning system of a vehicle to determine a position of the vehicle along the road, the mapping unit being adapted to:
    create the map data by obtaining characteristics associated with the road, the characteristics associated with the road comprising characteristics of one or several road markings arranged on a road surface of the road, wherein the characteristics comprise one or a combination of distances, intervals or relations between road markings, to thereby enable a positioning system for determining a longitudinal position of the vehicle along a road, which road comprises one or several road markings arranged on a surface of the road, the positioning system including
    a vision sensor unit adapted for detecting a plurality of road markings;
    a matching unit adapted for matching road markings of the plurality of road markings with mapped road markings of stored map data stored on a storage unit of the positioning system, based on comparing detected characteristics of the plurality of road markings with mapped characteristics of the mapped road markings, wherein the mapped characteristics comprise one or a combination of distances, intervals or relations between road markings;
    an identifying unit adapted for identifying a mapped identified road marking determined to correspond with a detected identified road marking of the plurality; and
    a positioning determining unit adapted for determining a longitudinal positioning estimate of the vehicle along the road based on a mapped road marking position associated with the mapped identified road marking.

15. A method performed by a positioning system of a vehicle for determining a longitudinal position of the vehicle along a road, the road comprising one or more road markings arranged on a surface of the road, the method comprising:
- detecting, by a sensor, one or more road markings;
- matching, by a matching unit, at least one of the one or more road markings with at least one mapped road marking of stored map data based on comparing at least one detected characteristic of the one or more road markings with at least one mapped characteristic of the at least one mapped road marking, wherein the mapped characteristics comprise one or a combination of distances, intervals or relations between road markings;
- identifying, by an identifying unit, a mapped identified road marking determined to correspond with a detected identified road marking of the one or more road markings; and
- determining, by a positioning determining unit, a longitudinal positioning estimate of the vehicle along the road based on a mapped road marking position associated with the mapped identified road marking.

* * * * *

UNITED STATES PATENT AND TRADEMARK OFFICE
CERTIFICATE OF CORRECTION

| | | |
|---|---|---|
| PATENT NO. | : 9,644,975 B2 | Page 1 of 1 |
| APPLICATION NO. | : 14/638949 | |
| DATED | : May 9, 2017 | |
| INVENTOR(S) | : Erik Stenborg et al. | |

It is certified that error appears in the above-identified patent and that said Letters Patent is hereby corrected as shown below:

In the Claims

Column 14, Line 43, Claim 2: "road makings is performed" should read --road markings is performed--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*